(12) United States Patent
Tsao et al.

(10) Patent No.: US 7,927,693 B2
(45) Date of Patent: Apr. 19, 2011

(54) HIGH CAPACITY HYDROGEN STORAGE MATERIAL AND METHOD OF MAKING THE SAME

(75) Inventors: Cheng-Si Tsao, Taoyuan County (TW); Ming-Sheng Yu, Taoyuan County (TW); Yi-Ren Tzeng, Taoyuan County (TW); Cheng-Yu Wang, Taoyuan County (TW); Hsiu-Chu Wu, Taoyuan County (TW); Tsui-Yun Chung, Taoyuan County (TW); Chun-Ching Chien, Taoyuan County (TW); Li-Fu Lin, Taoyuan County (TW)

(73) Assignee: Institute of Nuclear Energy Research Atomic Energy Council, Executive Yuan, Taiyuan County (TW)

( * ) Notice: Subject to any disclaimer, the term of this patent is extended or adjusted under 35 U.S.C. 154(b) by 435 days.

(21) Appl. No.: 12/260,262

(22) Filed: Oct. 29, 2008

(65) Prior Publication Data
US 2010/0021714 A1    Jan. 28, 2010

(30) Foreign Application Priority Data
Jul. 25, 2008 (TW) .............................. 97128453 A

(51) Int. Cl.
*B32B 3/26* (2006.01)
*C23F 1/02* (2006.01)

(52) U.S. Cl. ............... 428/305.5; 428/309.9; 428/314.2; 428/315.5; 216/39; 216/56

(58) Field of Classification Search .................... None
See application file for complete search history.

(56) References Cited

U.S. PATENT DOCUMENTS

| | | | |
|---|---|---|---|
| 2002/0096048 A1* | 7/2002 | Cooper et al. | 95/116 |
| 2005/0095189 A1* | 5/2005 | Brey et al. | 423/427 |
| 2006/0292062 A1* | 12/2006 | Hojo et al. | 423/594.9 |
| 2008/0128941 A1* | 6/2008 | Lopez et al. | 264/172.11 |

* cited by examiner

Primary Examiner — Ling Xu
(74) Attorney, Agent, or Firm — WPAT, PC; Justin King

(57) ABSTRACT

The present invention provides a high capacity hydrogen storage material in which a plural mesopore channels and fractal networks of nanopore channels communicating therewith and connecting to the micropores are formed in a microporous material, wherein a plural metal particles are formed on the surface of the mesopore and nanopore channels and of the micropores. In another embodiment, the present invention also provides a method for making the hydrogen storage material through oxidizing the microporous material so as to form a plural mesopore channels and fractal networks of nanopore channels, both of which are connected to the micropores to form a base for the deposition of metal particles capable of decomposing hydrogen molecules into hydrogen atoms. The high capacity hydrogen storage material is capable of increasing the capacity of hydrogen storage, and besides, the oxidizing process for making the hydrogen storage material is simple and has merits of saving cost.

15 Claims, 3 Drawing Sheets

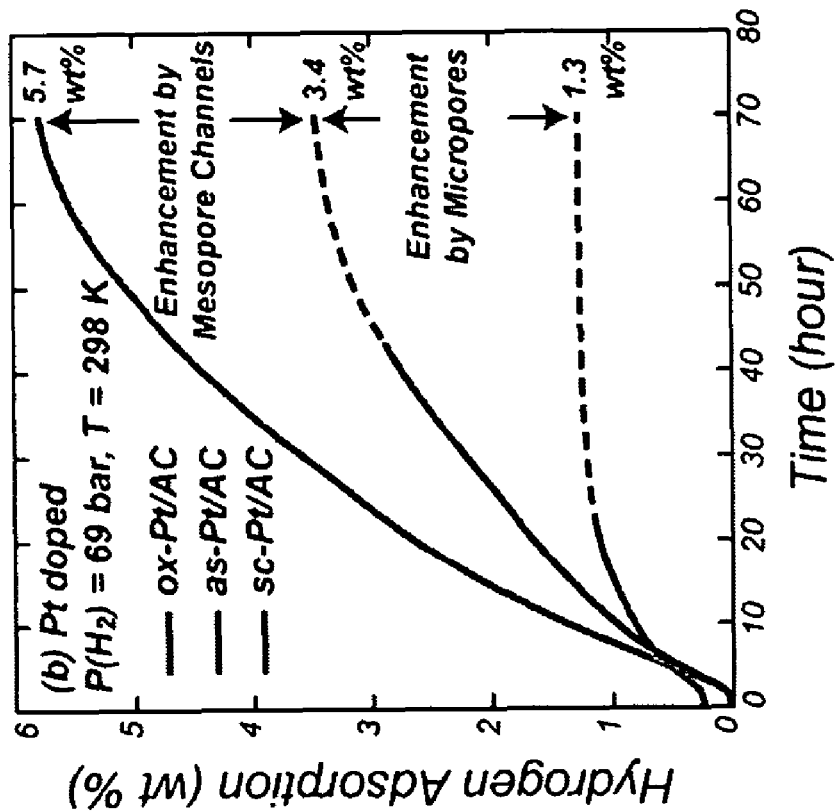
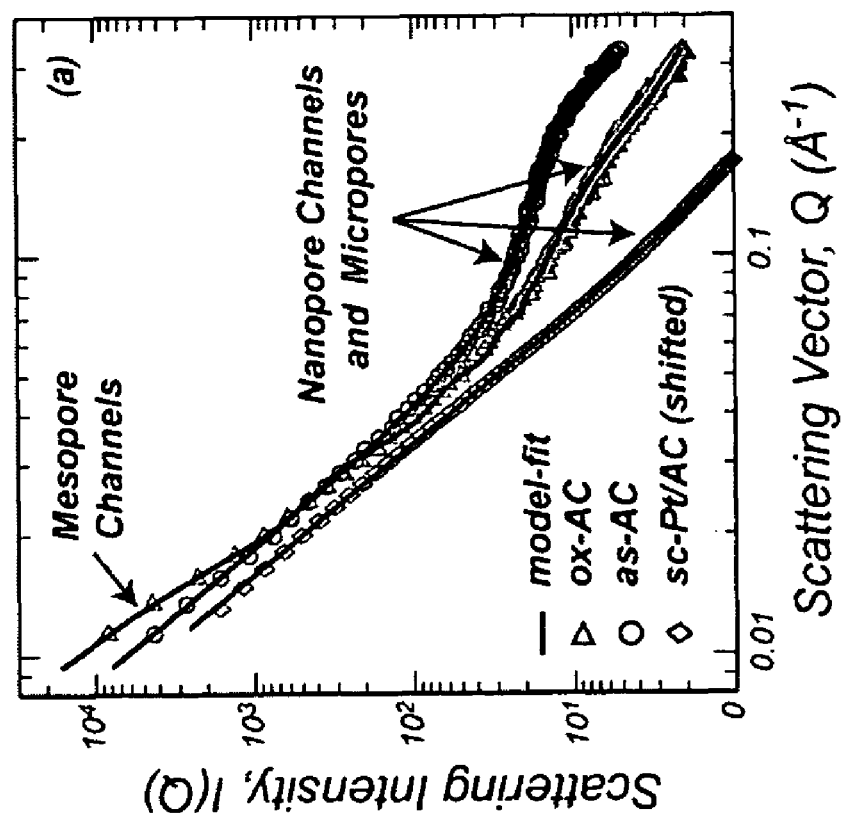
FIG. 3B
FIG. 3A

HIGH CAPACITY HYDROGEN STORAGE MATERIAL AND METHOD OF MAKING THE SAME

BACKGROUND OF THE INVENTION

1. Field of the Invention

The present invention generally relates to a high capacity hydrogen storage technology and, more particularly, to a high capacity hydrogen storage material and a method for making the same, in which a microporous material is oxidized to form channels of various sizes to communicate microporous structures to provide metal particles capable of decomposing hydrogen molecules into hydrogen atoms.

2. Description of the Prior Art

Since the advent of the industrial revolution in the late $18^{th}$ and early $19^{th}$ centuries, energy has been fundamental to the quality of our lives. With the increasing energy demand accompanying the growth of world population, we soon will be faced with fuel shortage and see more global-scale environmental degradation caused by the adverse effects of nowadays energy production and use, i.e., burning fossil fuels. Since the 1973 oil crisis, the developed countries have started to search for alternative energies, among which hydrogen energy has attracted tremendous attention because hydrogen can be obtained from water, which is abundant on earth. In addition, the hydrogen-fueled applications, such as fuel cells, are highly energy efficient and produce no greenhouse gases, such as carbon dioxide and etc, except water, which is environmentally friendly.

However, hydrogen exists in the form of gas under ambient condition and can only be liquefied below 33 K, which leads to considerable challenge and difficulty in storage and transportation. As a result, the lack of a proper storage method has become one of the main obstacles for the realization of hydrogen economy. Also due to the low gas density and strong repulsive force between hydrogen molecules, an ultra-high pressure tank is needed to store a large amount of hydrogen. This raises concerns over public safety giving rise to extra operating and maintenance cost on top of the compressing.

Hydrogen can also be stored in a liquid state. However, the boiling point of hydrogen molecules is −253° C. and therefore considerable amount of energy is needed to compress and liquefy hydrogen. The extra cost to maintain a cryogenic tank at such low temperature makes the onboard transportation impossible. Since the temperature of the environment for storing liquefied hydrogen is very low, a low-temperature apparatus is required. The liquefied hydrogen can thus be protected by liquid nitrogen to prevent from external heat. On the other hand, the exhaustion of hydrogen is also problematic.

Alternatively, hydrogen can be stored in solid-state materials, in which hydrogen is absorbed onto the surfaces of metal hydride or carbon based materials. Solid-state storage has the advantage in safety and ease of operating comparing to that using high pressure or cryogenic tanks. The drawback of the solid-state hydrogen storage materials is their low hydrogen uptake or release capacity at room temperature and many efforts have been devoted to increasing the storage capacity while keeping the adsorption and release processes reversible under ambient conditions. Conventional methods to increase the storage capacity have been aimed at increasing the density of adsorption sites by increasing the material's specific surface areas (SSAs). Alternatively, Yang and coworkers had disclosed in the *J. Am. Chem. Soc.* 128, 8136 (2006) and *J. Phys. Chem. C* 111, 11086 (2007) that the secondary spillover method by which a porous material was mixed with Pt doped activated carbon via a glucose bridge can enhanced the material's room temperature storage capacity from 0.4 to 4 wt %, an enhancement by a factor of 8. Here we provide a nanoporous material with modified surface chemistry and geometries of the pore structure that after being doped with transition metal particles exhibits even higher reversible hydrogen storage capacity at room temperature.

SUMMARY OF THE INVENTION

It is an object of the present invention to provide a high capacity hydrogen storage material and a method for making the same, in which a microporous structure is oxidized to form mesopore and nanopore channels in a fractal network communicating with the micropores to form a base for the deposition of metal particles capable of decomposing hydrogen molecules into hydrogen atoms. The high capacity hydrogen storage material is capable of storing a large amount of hydrogen at room temperature. Also the present invention provides a single oxidizing process to add functional groups and to make the specified pore structure in the microporous material that gives rise to high storage capacity. The process is simple and has merits of saving cost.

In one embodiment, the present invention provides a high capacity hydrogen storage material, comprising: a microporous hydrogen absorbing body that contains a plurality of micropores and at least a mesopore channel communicating with a plurality of nanopore channels, each of which being communicating with at least a micropore; and a plurality of metal particles, formed at least on either surface of the mesopore- or the nanopore channel, or of the micropores that are connected to the meso- or nano-pore channels.

In another embodiment, the present invention further provides a method for making a high capacity hydrogen storage material, comprising steps of: providing a microporous body comprising a plurality of micropores; oxidizing the microporous body so as to form at least a mesopore channel and a plurality of nanopore channels, which form a pore structure of fractal network and which communicate with at least a mesopore channel in the microporous body, each fractal network of the nanopore channels being communicating with at least a micropore; and forming a plurality of metal particles at least on either surface of one pore channel or of the micropores that communicate with the fractal network of the nanopore channels.

BRIEF DESCRIPTION OF THE DRAWINGS

The objects, spirits and advantages of the preferred embodiment of the present invention will be readily understood by the accompanying drawings and detailed descriptions, wherein:

FIG. 3A depicts the small angle X-ray scattering (SAXS) curves showing various structure of pore channels and micropores of the activated carbon before and after oxidation and that of a commercial platinum impregnated activated carbon; and FIG. 3B shows the amount of hydrogen uptake as a function of adsorption time for oxidized and un-oxidized activated carbon being impregnated with platinum nanoparticles and for the commercial platinum impregnated activated carbon measured by gravimetric methods at room temperatures and a pressure of 69 bar.

DETAILED DESCRIPTION OF THE PREFERRED EMBODIMENT

The present invention can be exemplified but not limited by the preferred embodiment as described hereinafter.

Figure 1:
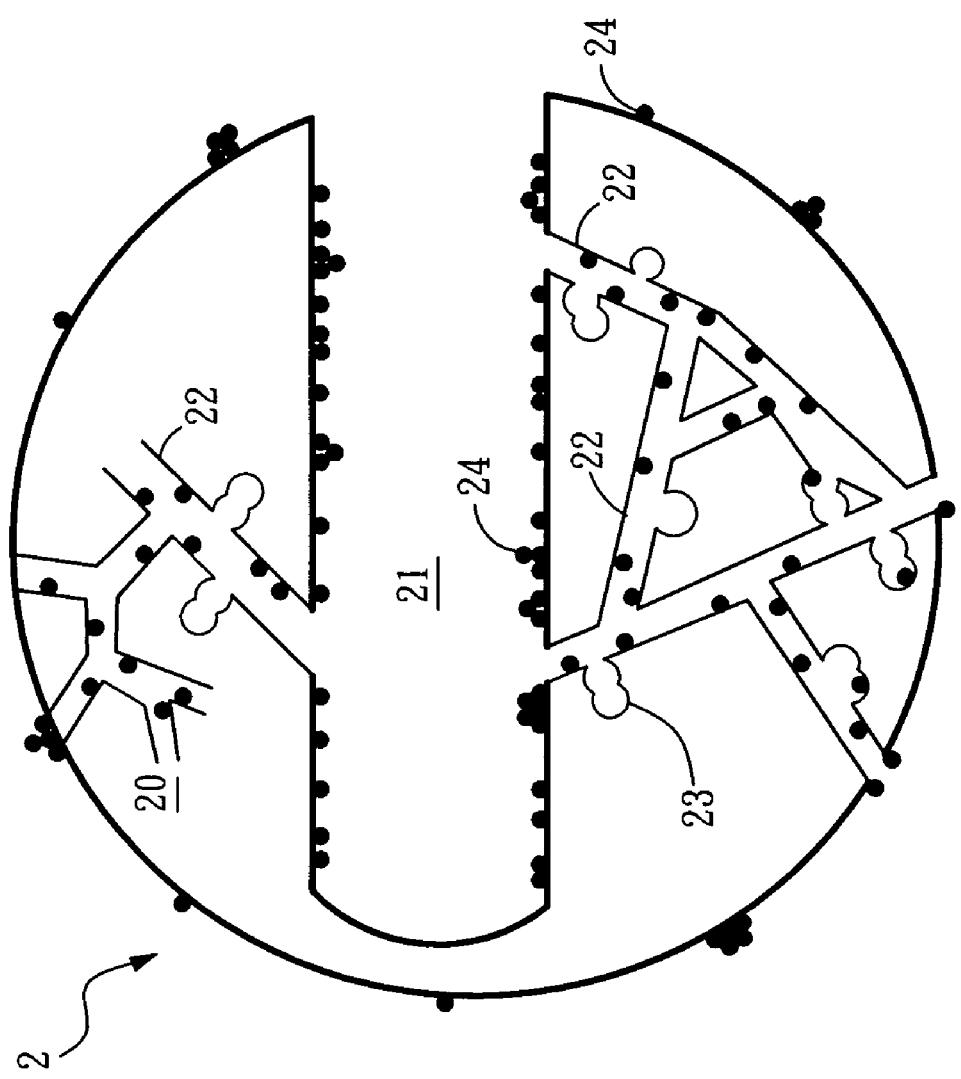
FIG. 1 is a microscopic diagram of a high capacity hydrogen storage material according to the present invention.

Please refer to FIG. 1, which is a microscopic diagram of a high capacity hydrogen storage material according to the present invention. The high capacity hydrogen storage material 2 comprises a microporous body 20 capable of absorbing hydrogen and comprising at least a mesopore channel 21, communicating with a plurality of nanopore channels 22 in a fractal network, each nanopore channel 22 being communicating with a plurality of micropores 23. In the present embodiment, the diameter of the nanopore channels is larger than 2 nm, while the size of the micropores is smaller than 2 nm. Moreover, the diameter of the mesopore channels is larger than 3 nm. The microporous body is formed of a material comprising activated carbon, but is not limited thereto.

In FIG. 1, a plurality of metal particles, that are capable of decomposing hydrogen molecules into hydrogen atoms, are formed at least on either surface of the mesopore or the nanopore channel or of the micropores. The decomposed hydrogen atoms are absorbed on the mesopore channels, on the fractal network of nanopore channels and on the micropores, which communicate with the pore channels. In the present embodiment, the metal particles are formed of platinum (Pt), but not limited thereto. The high capacity hydrogen storage material of the present invention is capable of absorbing hydrogen atoms at room temperature.

Figure 2:
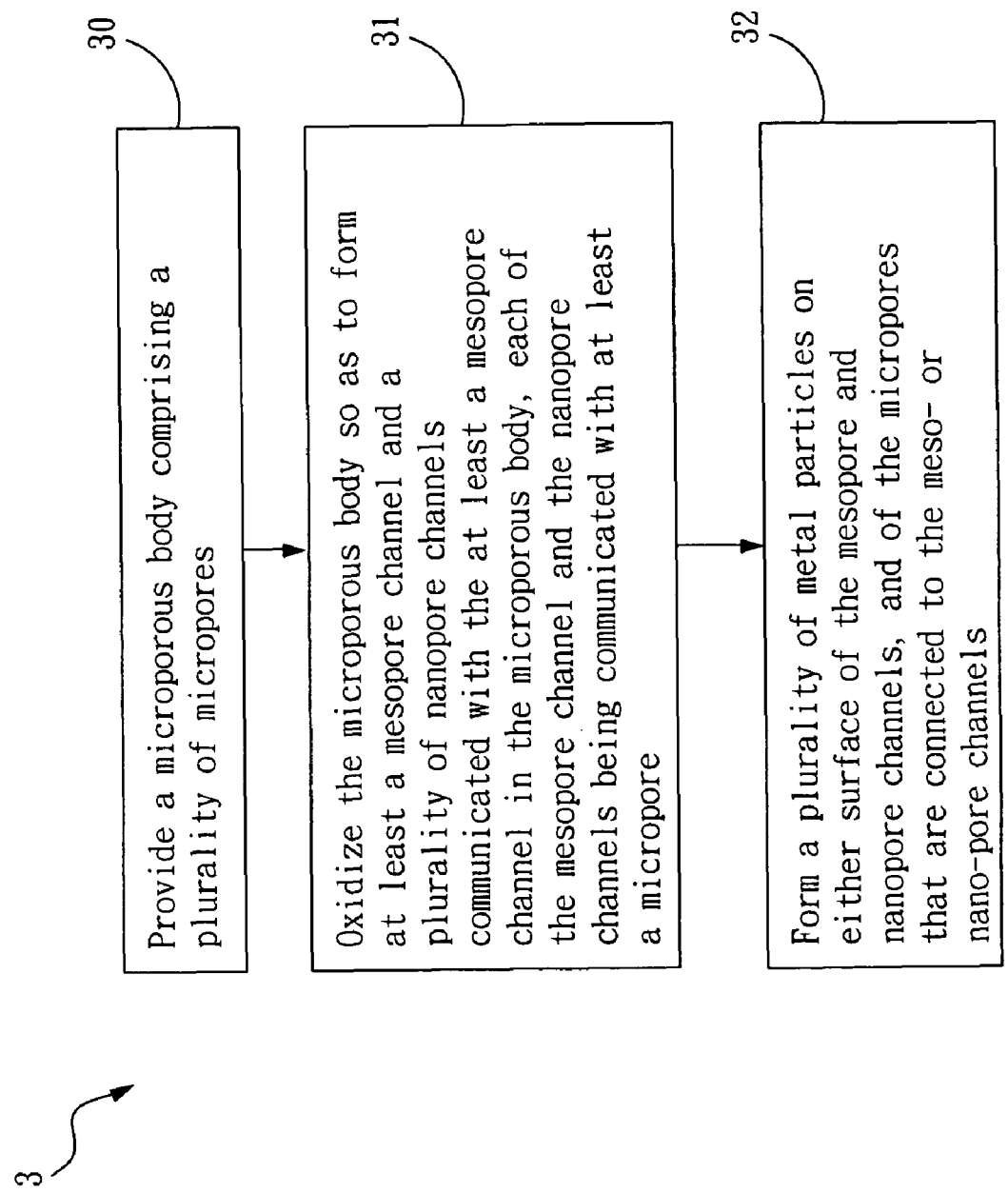
FIG. 2 is a flowchart of a method for making the high capacity hydrogen storage material according to the present invention.

FIG. 2 is a flowchart of a method for making the high capacity hydrogen storage material according to the present invention. In the present embodiment, the method 3 comprises steps as described below. First, in Step 30, a microporous body comprising a plurality of micropores is provided. The microporous body is formed of a material comprising activated carbon, but not limited thereto. Later, in Step 31, the microporous body is oxidized. In the present embodiment, the microporous body is oxidized in a heated acid solution. By reacting with the acid, at least a mesopore channel and a plurality of nanopore channels communicate with the at least a mesopore channel are formed in the microporous body, and each of the such formed meso- and nano-pore channels are communicating with at least a micropore. In this step, a portion of the nanopore channels are oxidized to be widened so that the mesopore channels of larger diameter are formed. Finally, in Step 32, a plurality of metal particles are formed at least on either surface of the mesopore or the nanopore channel or of the micropores in the microporous body.

As an example, a microporous body is formed of activated carbon. The microporous body comprises nanopore channels with a fractal dimension of about 3.0. Note that the amount of mesopore channels in the original microporous body is too small to be detected by small angle X-ray scattering (SAXS). In order to increase the amount of mesopore channels, the microporous body is immersed in a 100 mL acid solution heated on a hot plate of ~150° C. for 120 minutes. More particularly, the acid solution comprises 8M $HNO_3$ (60.0 mL) and 2M $H_2SO_4$ (11.1 mL). The oxidation process removes impurities, adds function groups and etches away more than 50% of carbon. Therefore, mesopore channels and a plurality of nanopore channels in a fractal network communicating with the mesopore channels are formed in the microporous body. Each of the nanopore channels further communicates with a plurality of micropores, as shown in FIG. 1.

Then, the rinsed and dried oxidized microporous body is immersed in a reducing solution containing an electrocatalyst precursor salt ($H_2PtCl_6.6H_2O$, 1 g), ethylene glycol (50 ml) and 10% $NaHSO_3$ (1 mL) with the solution's pH value adjusted to ~4 using sodium hydroxide (4N, 1 ml). The reducing solution is then placed on a hot plate of ~130° C. for 120 minutes so that the platinum (Pt) particles can be grown on the meso- and nano-pore channels and on the micropores that are communicating with the pore channels.

Please refer to FIG. 3A, which depicts small angle X-ray scattering (SAXS) curves showing pore structures of activated carbon before and after oxidation treatment and that of commercial platinum impregnated activated carbon. In FIG. 3A, the activated carbon prior to the oxidation treatment mainly comprises a fractal network of nanopore channels (with a diameter of 2.1 nm) and micropores (with a diameter of 1.3 nm). The amount of the mesopore channels is too small to be detected by SAXS. For the oxidized activated carbon, the diameter of the nanopore channels is widened to 3.2 nm and the diameter of the micropores is about 0.92 nm. The mesopore channels formed by oxidization have a diameter of 36.8 nm. In the present embodiment, it is observed that, after oxidation, ~35% of the activated carbon is oxidized to form wider nanopore channels and new mesopore channels. The commercial platinum impregnated activated carbon comprises only a little amount of nanopore channels and micropores and no detectable mesopore channel.

FIG. 3B shows the amount of hydrogen uptake as a function of adsorbing time for the oxidized and the un-oxidized activated carbon after being impregnated with platinum nanoparticles and for the commercial platinum impregnated activated carbon measured by gravimetric methods at room temperatures and a pressure of 69 bar. In FIG. 3, the commercial platinum impregnated activated carbon exhibits 1.3 wt % of hydrogen storage capacity. After being impregnated with platinum particles, the unoxidized activated carbon exhibits a hydrogen storage capacity of 3.4 wt %. By comparing to the SAXS data in FIG. 3, we found that the increase of hydrogen storage is because that the unoxidized activated carbon comprises more micropores and nanopore channels than the commercial platinum impregnated activated carbon. In the present invention, by oxidizing the activated carbon and followed by platinum impregnation, the hydrogen storage further increases to 5.7 wt %. As a result, we found the presence of mesopore channels effectively enhance the hydrogen storage capacity.

According to the above discussion, it is apparent that the present invention discloses a high capacity hydrogen storage material that is capable of storing a large amount of hydrogen at room temperature. Also the present invention provides a single oxidizing process to add functional groups and to make the specified pore structure in the microporous material that gives rise to high storage capacity. The process is simple and has merits of saving cost. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A high capacity hydrogen storage material, comprising:
a microporous body, capable of absorbing hydrogen and comprising a plurality of micropores and at least a mesopore channel communicating with a plurality of nanopore channels, each nanopore channel being communicating with at least a micropore; and a plurality of metal particles, formed at least on either surface of the mesopore or the nanopore channel, or of the micropores.

2. The high capacity hydrogen storage material as recited in claim 1, wherein the metal particles are capable of decomposing hydrogen molecules into hydrogen atoms.

3. The high capacity hydrogen storage material as recited in claim 1, wherein the diameter of the nanopore channels is larger than 2 nm.

4. The high capacity hydrogen storage material as recited in claim 1, wherein the size of the micropores is smaller than 2 nm.

5. The high capacity hydrogen storage material as recited in claim 1, wherein the diameter of the mesopore channels is larger than 3 nm.

6. The high capacity hydrogen storage material as recited in claim 1, wherein the microporous body comprises a material capable of absorbing hydrogen atoms at room temperatures.

7. The high capacity hydrogen storage material as recited in claim 1, wherein a plurality of nanopore channels are distributed as a fractal network.

8. The high capacity hydrogen storage material as recited in claim 1, wherein the at least a mesopore channel, a plurality of micropores and nanopore channels are formed by oxidation.

9. A method for making a high capacity hydrogen storage material, comprising step of:

providing a microporous body comprising a plurality of micropores;

oxidizing the microporous body so as to form at least a mesopore channel and a plurality of nanopore channels communicating with at least a mesopore channel in the microporous body, each of the mesopore channel and the nanopore channels being communicating with at least a micropore; and forming a plurality of metal particles at least on either surface of the mesopore or the nanopore channel, or of the micropores in the microporous body.

10. The method for making a high capacity hydrogen storage material as recited in claim 9, wherein the metal particles are capable of decomposing hydrogen molecules into hydrogen atoms.

11. The method for making a high capacity hydrogen storage material as recited in claim 9, wherein the diameter of the nanopore channels is larger than 2 nm.

12. The method for making a high capacity hydrogen storage material as recited in claim 9, wherein the size of the micropores is smaller than 2 nm.

13. The method for making a high capacity hydrogen storage material as recited in claim 9, wherein the diameter of the mesopore channels is larger than 3 nm.

14. The method for making a high capacity hydrogen storage material as recited in claim 9, wherein the microporous body comprises a material capable of absorbing hydrogen atoms at room temperatures.

15. The method for making a high capacity hydrogen storage material as recited in claim 9, wherein a plurality of nanopore channels are distributed as a fractal network.

* * * * *